US 12,421,265 B2

(12) United States Patent
Boot et al.

(10) Patent No.: US 12,421,265 B2
(45) Date of Patent: Sep. 23, 2025

(54) METHOD FOR OBTAINING A LIGNIN OIL COMPOSITION USING A COMPRESSED GAS AND ACID ASSISTED PROCESS

(71) Applicant: VERTORO B.V., Geleen (NL)

(72) Inventors: Michael Dirk Boot, Geleen (NL); Panagiotis Kouris, Geleen (NL); Emiel Jan Maria Hensen, Geleen (NL); Xiaoming Huang, Geleen (NL)

(73) Assignee: VERTORO B.V., Geleen (NL)

( * ) Notice: Subject to any disclaimer, the term of this patent is extended or adjusted under 35 U.S.C. 154(b) by 794 days.

(21) Appl. No.: 17/764,598

(22) PCT Filed: Sep. 30, 2020

(86) PCT No.: PCT/EP2020/077411
§ 371 (c)(1),
(2) Date: Mar. 29, 2022

(87) PCT Pub. No.: WO2021/064047
PCT Pub. Date: Apr. 8, 2021

(65) Prior Publication Data
US 2022/0356201 A1    Nov. 10, 2022

(30) Foreign Application Priority Data
Sep. 30, 2019    (EP) .................................. 19200489

(51) Int. Cl.
*C07G 1/00*    (2011.01)
(52) U.S. Cl.
CPC .................................... *C07G 1/00* (2013.01)
(58) Field of Classification Search
CPC ............................................................ C07G 1/00

USPC .......................................................... 530/507
See application file for complete search history.

(56) References Cited

FOREIGN PATENT DOCUMENTS

| CN | 108179644 A | * | 6/2018 | ............ D21B 1/303 |
| WO | 2019053287 A1 | | 3/2019 | |

OTHER PUBLICATIONS

Li et al., CN 108179644 A machine translation in English, Jun. 19, 2018. (Year: 2018).*
Baumberger, S., Using Transgenic Poplars to Elucidate the Relationship between the Structure and the Thermal Properties of Lignins, J. Agric. Food Chem., 2002, pp. 2450-2453, vol. 50, American Chemical Society.
Cachet, N., Esterification of organosolv lignin under supercritical conditions, Industrial Crops and Products, 2014, pp. 287-297, vol. 58, Elsevier B.V.
Dodd, A., Characterization of Fractions Obtained from Two Industrial Softwood Kraft Lignins, ASC Sustainable Chem. & Eng., Nov. 24, 2014, pp. 103-110, vol. 3, ACS Publications.

(Continued)

*Primary Examiner* — David T Karst
(74) *Attorney, Agent, or Firm* — Hudak, Shunk & Farine Co. LPA

(57) ABSTRACT

A process for the production of a liquid lignin composition, in particular to a method for obtaining a lignin composition using a compressed gas and acid assisted process, wherein a lignocellulosic biomass feedstock is treated with a polar organic solvent using an inorganic acid to assist in the release of lignin into the polar organic solvent and the use of compressed gas to keep the polar organic solvent in its liquid phase.

13 Claims, 7 Drawing Sheets

(56) References Cited

OTHER PUBLICATIONS

Li, H, Fractionation and characterization of industrial lignins, Industrial Crops and Products, 2014, pp. 67-76, vol. 62, Elsevier B.V.

Ouyang, X., Coupling organosolv fractionation and reductive depolymerization of woody biomass in a two-step catalytic process, Green Chem, 2018, pp. 2308-2319, vol. 20, The Royal Society of Chemistry, XP55766383A.

Park, S.Y., Fractionation of lignin macromolecules by sequential organic solvents systems and their characterization of further valuable applications, International Journal of Biological Macromolecules, 2018, pp. 793-802, vol. 106, Elsevier B.V.

Passoni, V., Fractionation of Industrial Softwood Kraft Lignin: Solvent Selection as a Tool for Tailored Material Properties, ACS Sustainable Chem. & Engin., Feb. 19, 2016, pp. 2232-2242, vol. 4, ACS Publications.

Ropponen, J., Solvent extraction as a means of preparing homogeneous lignin fractions, Holzforschung, 2011, pp. 543-549, vol. 65, Walter de Gruyter, Berlin—Boston.

Saito, T., Methanol Fractionation of Softwood Kraft Lignin: Impact of the Lignin Properties, ChemSusChem, 2014, pp. 221-228, vol. 7, Wiley-VCH Verlag GmbH & Co. KGaA, Weinheim.

Sammons, R., Characterization of Organosolv Lignins using Thermal and FT-IR Spectroscopic Analysis, BioResources, 2013, pp. 2752-2767, vol. 8, No. 2, bioresources.com.

Sannigrahi, P., Lignin Structural Modifications Resulting from Ethanol Organosolv Treatment of Loblolly Pine, Energy Fuels, Oct. 9, 2009, pp. 683-689, vol. 24, pubs.asc.org/EF.

Schulze, P., Advanced process for precipitation of lignin from ethanol organosolv spent liquors, Bioresource Technology, 2016, pp. 128-134, vol. 199, Elsevier Ltd.

Sen, S., Methylation of softwood kraft lignin with dimethyl carbonate, Green Chem., 2015, pp. 1077-1087, vol. 17, The Royal Society of Chemistry.

Shuai, L., Formaldehyde stabilization facilitates lignin monomer production during biomass deploymerization, Science, 2016, pp. 329-333, vol. 354, Issue 6310, sciencemag.org.

Sun, Q., A study of popular organosolv lignin after melt rheology treatment as carbon fiber precursors, Green Chemistry, 2016, pp. 5015-5024, vol. 18, The Royal Society of Chemistry.

Tao, J., Effects of organosolv fractionation time on thermal and chemical properties of lignins, RSC Advances, 2016, pp 79228-79235, vol. 6, Royal Society of Chemistry.

Wang, Y., Fast Fractionation of Technical Lignins by Organic Cosolvents, ASC Sustainable Chem. Eng., 2018, pp. 6064-6072, vol. 6, ACS Publications.

\* cited by examiner

METHOD FOR OBTAINING A LIGNIN OIL COMPOSITION USING A COMPRESSED GAS AND ACID ASSISTED PROCESS

FIELD OF THE INVENTION

The present invention relates to a process for the production of a liquid lignin composition, in particular to a method for obtaining a lignin composition using a compressed gas and acid assisted process. Additionally, the present invention relates to a crude lignin oil (CLO) obtainable through such a method.

BACKGROUND OF THE INVENTION

The extraction of lignin from lignocellulosic materials can be achieved in many different ways. The most common methods are the sulphate and sulphite pulping processes, however both processes producing lignin which contains sulphur. Alternatively, there are also processes which produce sulphur free lignin, such as steam explosion, soda pulping process and various organosolv pulping processes. Organosolv pulping is one of the most promising methods. Typical organosolv processes are performed in a mixture of water and an organic solvent, usually alcohols at temperatures below 200° C. Acids such us sulfuric acid, phosphoric acid, hydrochloric acid, formic acid and acetic acid are being used as co-catalysts, cleaving the lignin-carbohydrate linkages, releasing lignin from the lignocellulosic matrix and finally improving the process efficiency.

The conventional organosolv pretreatment process was developed in order to overcome limitations of kraft and sulfite pulping. Organosolv solvents are easily recovered by distillation, leading to less water pollution and elimination of the odour usually associated with kraft pulping. Fundamentally, the typical organosolv process is using aqueous organic solutions. Organic solvents including methanol, ethanol, acetone or butanol are mixed first with water. The concentration of solvent in water ranges from 40 to 80%. Organic solvents are used as a mixture with water for process considerations such as reducing the vapour pressure and lowering the pH in order to also solubilize the hemicellulose part of the biomass. In general, the organosolv process is considered as a (hemi)-cellulose first technology that targets in a lignin-free cellulose pulp (feedstock for paper or 2 G ethanol production) and an aqueous sugar fraction stream (derived by hemicellulose). In that process, lignin is isolated after acid water precipitation of the concentrated black liquor, which results in a recalcitrant solid form lignin with high molecular weight, poor solubility and high glass transition temperature; mainly due to condensation reactions that take place during processing and post-processing steps. Water is added and utilized in multiple stages during the organosolv pretreatment process. First, as a co-solvent for the delignification of woody biomass and secondly as a precipitation agent for solid lignin recovery. Water is essential for that process, since side products like hemicellulose sugars and furfural can be solubilized in the water and later on isolated for further valorization. Acid-catalyzed hydrolysis and degradation of monosaccharides to furfural, hydroxymethylfurfural (HMF) and other degradation products are some of the main reaction pathways. Organosolv pretreatment is reported to yield readily hydrolyzable substrates with good cellulose to glucose conversion (decreased crystallinity) and low lignin content. However, organosolv pretreatment is an expensive process, and the solvents used must be recovered to reduce costs.

However, during lignin extraction and downstream recovery steps undesired condensation reactions can take place, leading to recalcitrant C—C bonds, rendering the resulting solid lignin material unreactive towards desired depolymerisation for higher value products. For that reason, a new strategy towards lignocellulose upgrading has been developed that aims to convert the native lignin, in the biomass directly upon release from the lignocellulosic matrix, into valuable monomers. This approach is called "lignin-first process" (LFP) or "reductive catalytic fractionation" (RCF). In a traditional LFP RCF processes, lignin is first extracted from the cell wall matrix by an organic solvent combined with a mineral acid and is simultaneously disassembled/depolymerized via hydrogenolysis with a heterogeneous redox metal catalyst. Usually, these two chemical steps are occurring in one combined step.

In "Coupling organosolv fractionation and reductive depolymerization of woody biomass in a two-step catalytic process; Ouyang et al., 2018, Green chemistry 20(10), 2308-2319", a two-step process is proposed in order to overcome the biggest drawback of the one-pot RCF process: the recovery of the heterogeneous catalysts from the wood residue. The two-step process is an alternative way to avoid direct contact between the heterogeneous catalyst and the solid feedstock, making the catalyst recovery feasible. In the first step of the two-step process, reductive lignocellulose fractionation takes place using an organic solvent and a mineral acid, followed by catalytic hydrogenolysis of the obtained lignin oil to aromatic monomers. In the scientific publication "Formaldehyde stabilization facilitates lignin monomer production during biomass depolymerization; Shuai et al., 2016, Science, Vol 354, Issue 6310, 329-333" a two-step method involving the HCl catalyzed extraction of lignin in the presence of formaldehyde, thereby suppressing repolymerization, is also reported. Thereafter, focus lay upon optimizing the first delignification step to minimize the lignin repolymerization by using different types of acids, including sulphuric acid ($H_2SO_4$), aluminium triflate (Al$(OTf)_3$), phosphoric acid ($H_3PO_4$), and hydrochloric acid (HCl).

Peter Schulze et al in Bioresource Technology vol. 199, 18 September 2015, pages 128-134 describes a process for precipitation of lignin from ethanol organosolv spent liquors. The process contains a step of fractionation of industrial debarked beech wood chips by ethanol-water pulping using a batch process. The solvent contains a 50% ethanol 50% water mixture with 0.5 wt. % sulphuric acid as catalyst. As a result 2.2-2.6 wt. % of lignin is dissolved in the ethanol/water mixture, while 5.3-6.5 wt,% of solids is present (including lignin).

Poulomi Sannigrahi et al in Eenergy Fueks 2010, 24, 683-689 discloses lignin structural modifications resulting from ethanol organosols treatment of Loblolly pine. The process comprises a treatment of pine sawdust with 65% ethanol/water mixture and 1.1 wt. % sulfuric acid at 170 C in a reactor.

WO2019/053287 describes a method for obtaining a stable lignin/polar organic solvent composition via mild solvolytic modifications. This process does not apply any added reaction promotor.

Next to the catalyst recovery, another industrial requirement for commercialization of this process is the biomass-to-solvent feeding ratio during the lignin extraction step. In most of the aforementioned prior art focusing on the RCF process, the wood-to solvent ratios going into the reactor were chosen between 1:10 and 1:60 w/v, with higher biomass loadings generally manifesting in prohibitively high char formation and/or condensation reactions and/or low conversion towards mono-aromatics. The traditional organosolv process that was originally designed in the 1970s, has already been optimized. The optimum liquor to solids ratio ranges from 4:1 to 10:1 (w/w), which made this process techno-economically attractive. Organosolv pulping has two main target products: (hemi)cellulose (for pulp or fuel ethanol production) and lignin. The recovery of solid lignin from organosolv pulping can be catalysed by the addition of acidified water. The lignin precipitates and forms spherical aggregates ranging from 0.5-2.5 μm. Filtration, while time consuming, is then most effective while the mixture is hot (>100° C.). Recovery can be achieved by filtration or centrifugation. Due to the hydrophobic nature of organosolv lignin, flotation of organosolv lignin is effective without the use of the collecting and precipitating agents that are required for flotation of the competitive kraft lignin. On the other hand, the two-step RCF process which delivers stable lignin oils, compared to the condensed solid lignin streams of the organosolv methods, requires additional optimization.

The main rationale for the diluted ratios chosen by the prior art is to prevent fouling of the equipment and catalyst surface and achieve very high monomer yields. Such fouling is caused by deposition of heavy insoluble materials that are either present in the feedstock or formed in situ by decomposition or repolymerization reactions. An economic drawback is that the cost of the fractionation of biomass is typically high, because such diluted feeds would require an unrealistically high capital expenditure (CAPEX), given that CAPEX scales quite well with total volume/mass flow through a production plant.

It is therefore an objective of the invention to overcome these drawbacks by providing a method for the production of a liquid lignin composition wherein the first lignin extraction step is improved to achieve high delignification rates at the highest biomass to solvent ratio possible. The main objective of the present invention, compared to the already developed biomass fractionation technologies (i.e. acid, alkaline, organosolv, hydrolysis and stream explosion processes) is to produce a crude lignin oil composition instead of a lignin-rich solid feedstock as a side stream.

SUMMARY OF THE INVENTION

The object of the invention is achieved in a process for the production of a crude liquid lignin oil (CLO), said process comprising the steps of:
a. providing a lignocellulosic feedstock,
b. treating the lignocellulosic feedstock with a polar organic solvent in
the presence of an inorganic acid and added gas to provide a crude liquid
lignin oil (CLO),
wherein the treatment is conducted at an operating temperature between 100° C. and 210° C., at an operating pressure lower than 200 bar and at least 1 bar above the vapour pressure of the polar organic solvent at the operating temperature, a residence time up to 240 minutes, and wherein the ratio (w/w) of lignin (in lignocellulosic feedstock) to polar organic solvent ranges between 1:1.5 and 1:9.

The invention further relates to a CLO which contains lignin and methylated sugars.

The lignin present in the CLO has a low molecular weight and a low glass transition temperature, which gives the CLO high processability.

Further the absence of water in the process gives advantages of reduced downstream processing and a low CAPEX for scaling up the technology.

BRIEF DESCRIPTION OF THE DRAWINGS

In FIG. 4 we clearly observe the influence of higher biomass loadings on the parameter lignin oil yield/total mass. We conclude that delignification is a relative term that should always be linked to the amount of feedstock used. Decreased degree of delignification does not always necessarily mean lower total mass of lignin (or lignin oil) extracted

DETAILED DESCRIPTION OF THE INVENTION

Figure 1:
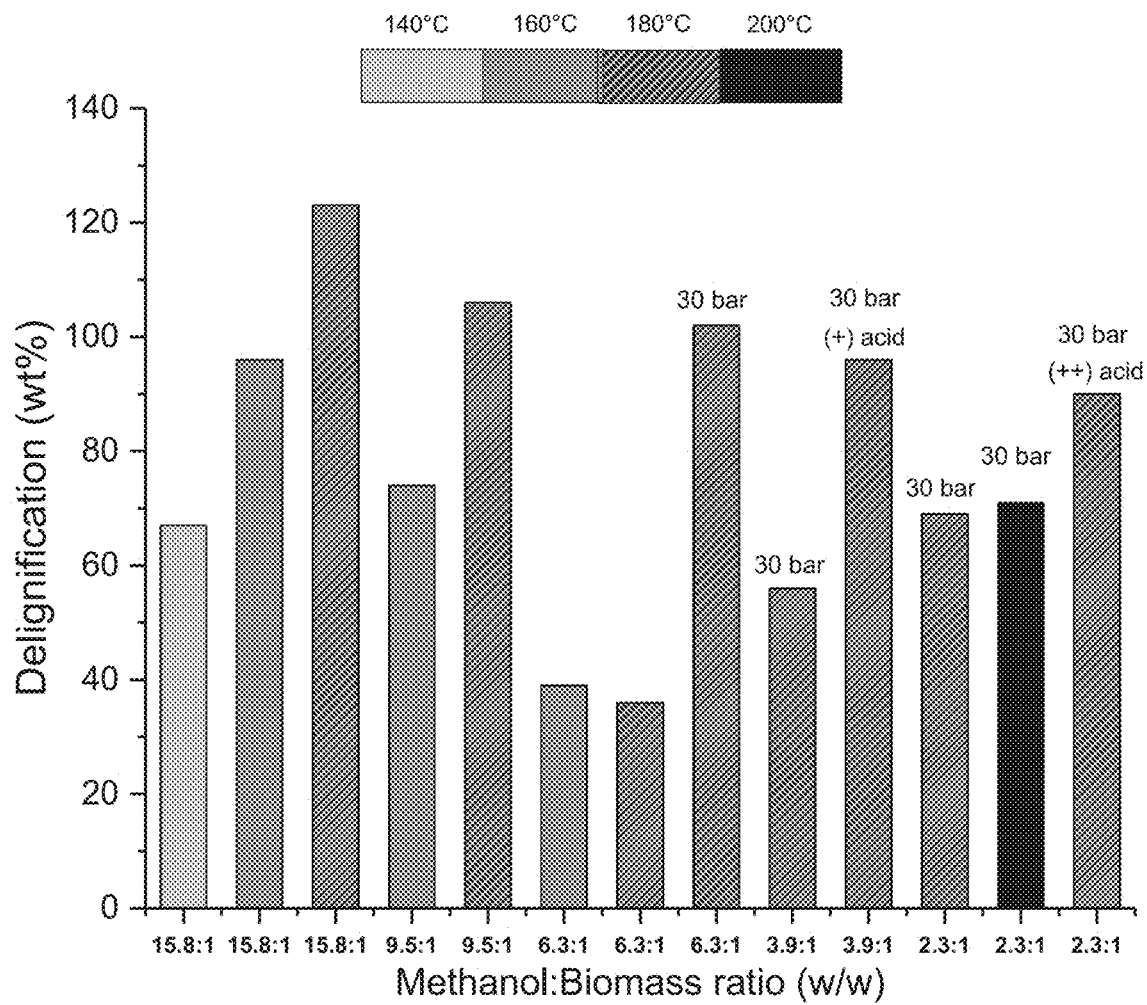
FIG. 1 shows the effect of overall process conditions in degree of delignification. In all the experiments 2 h reaction time has been used. Temperature varied from 140-200° C. [30 bar $N_2$ applied in the 6.3:1 M:B ratio until the end/(+) acid concentration: increase acid concentration to 8 mmol/L/(++) acid concentration: increase further acid concentration to 10 mmol/L]. M stands for methanol and B stands for biomass.
Figure 2:
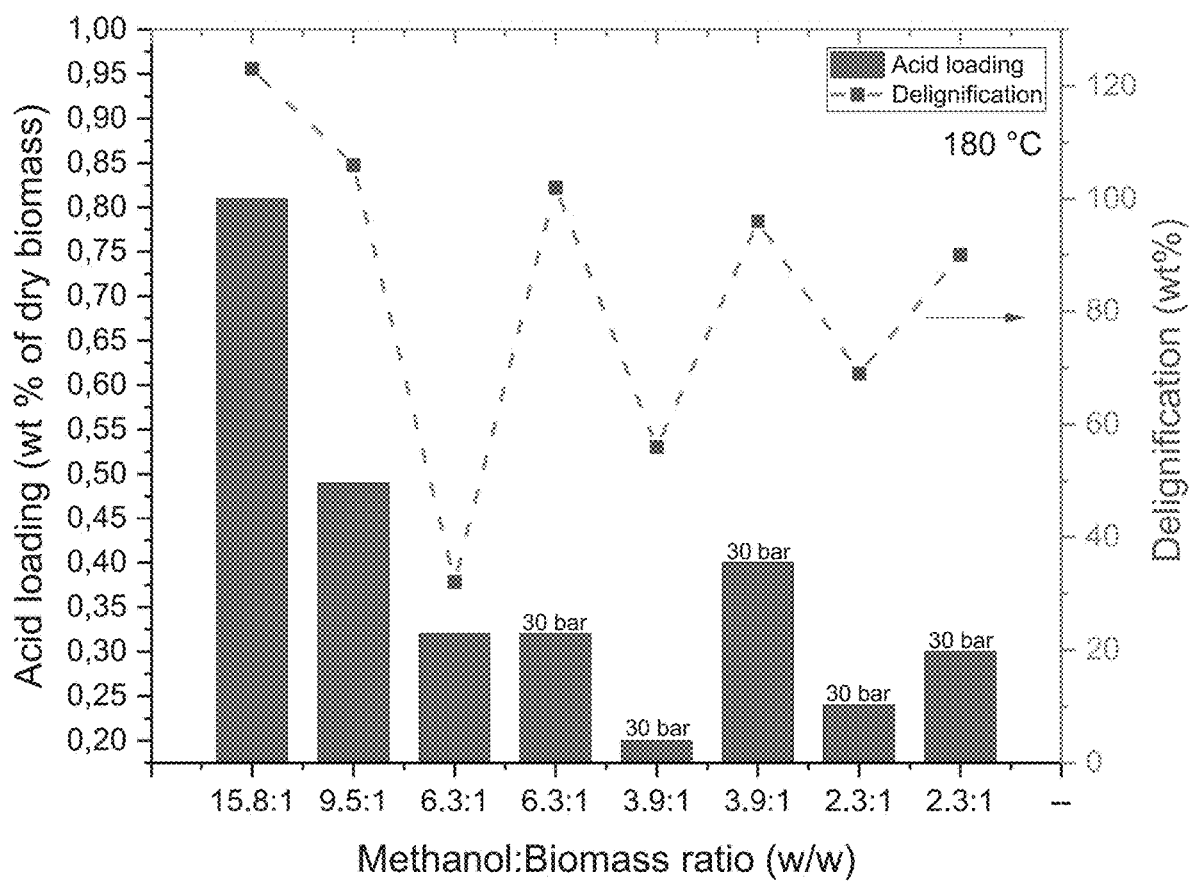
FIG. 2 represents the influence of the acid loading (expressed in wt % of loaded dry biomass) on the delignification rate, at varied methanol:biomass ratios. At constant reaction temperature, we observe a clear correlation between the delignification and the total acid in the system. In our efforts to define the optimum methanol:biomass ratio, we found that increasing the biomass loading requires of course less methanol in the system—accordingly this is translated to less add loading. Compensation of acid (impact on CSF) during our optimization experiments was required in order to improve the lignin extraction. We can observe, that in our optimum solvent:solids ratio (2.3:1), where 90 wt. % delignification was achieved, less acid is required (1.66 times less) compared to the initial diluted stage of 15.8:1.
Figure 3:
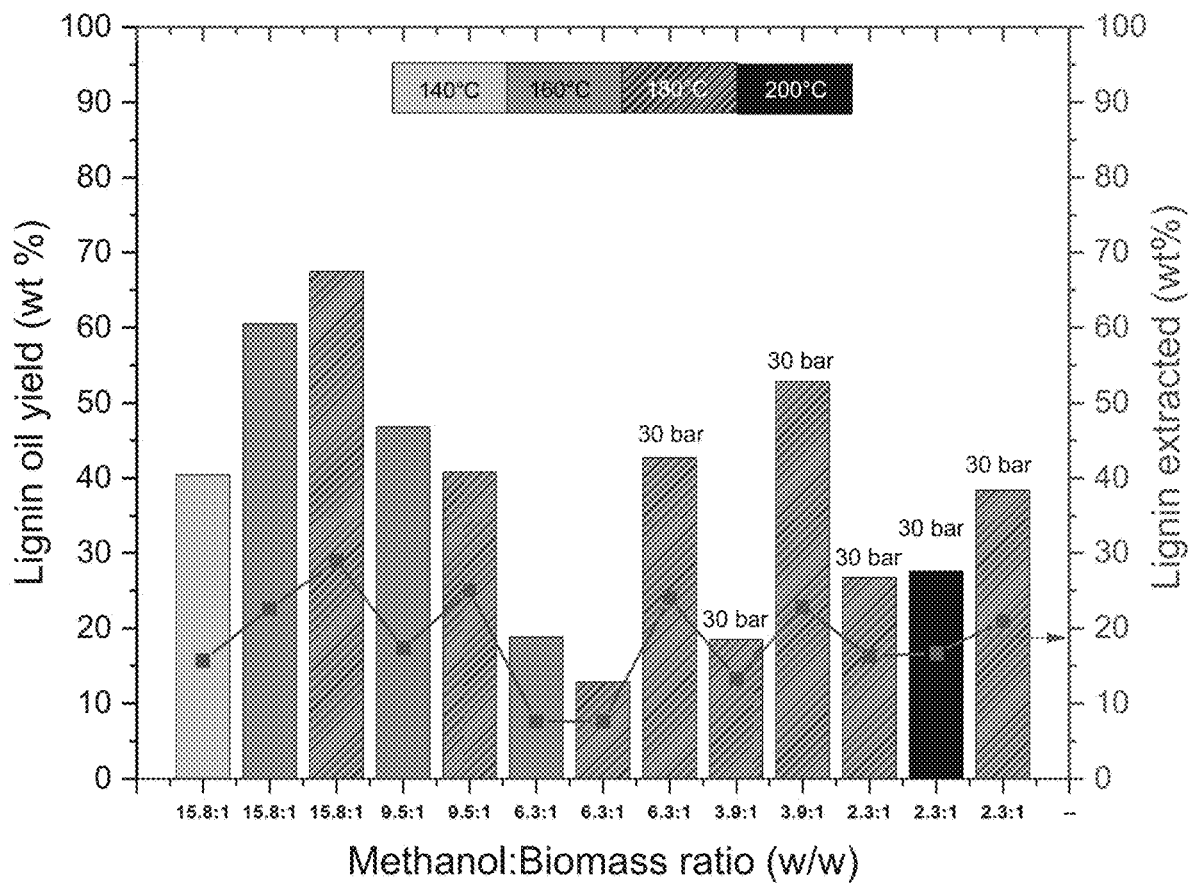
FIG. 3. shows Lignin oil yields (lignin & sugar fraction) and total lignin extracted at varied process conditions.
Figure 4:
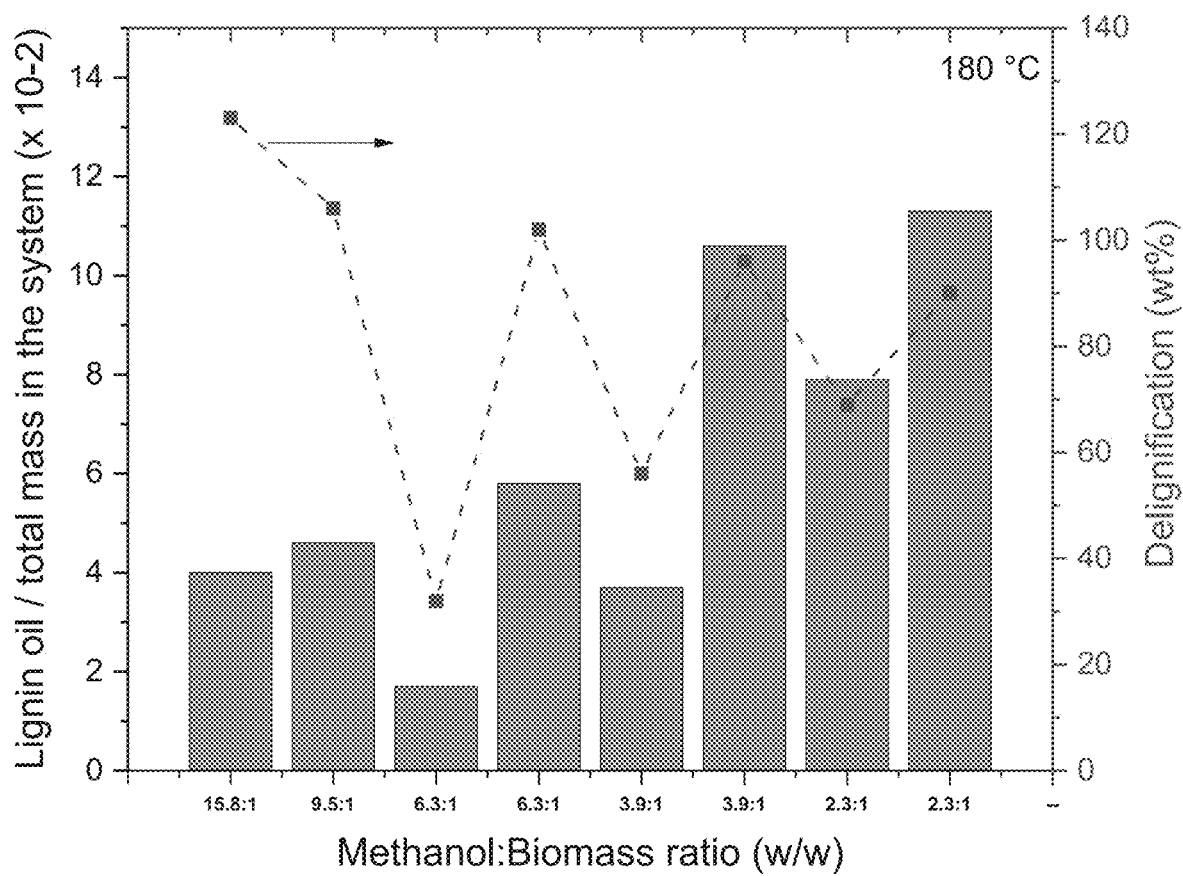
FIG. 4 shows the effect of methanol:biomass ratio (w/w) on the dimensionless parameter: lignin oil yield/total mass that flows in the system (included biomass+methanol+acid).
Figure 5:
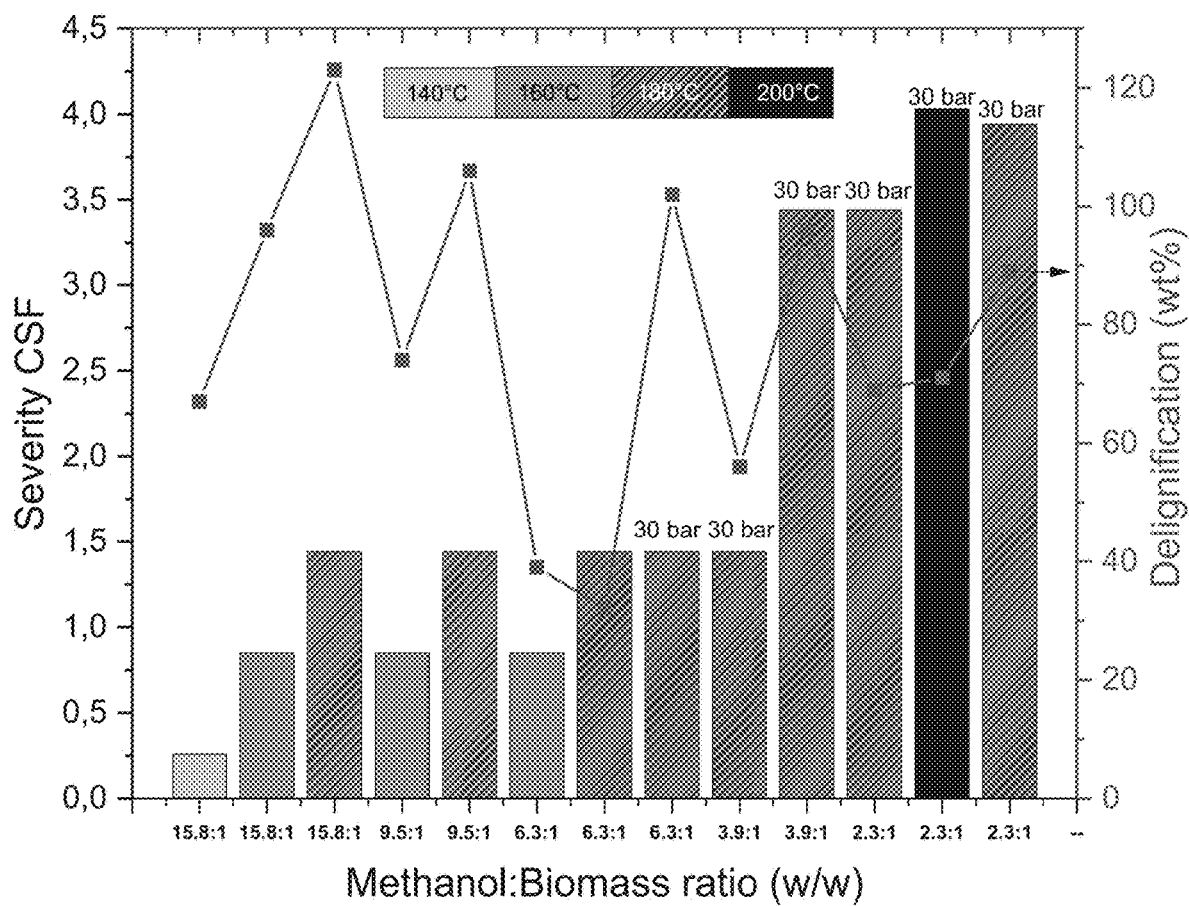
FIGS. 5 & 6 show the effect of CSF (severity factor) on the degree of delignification and the total sugars extracted and quantified in the lignin oil. Severity factor cannot be used to compare different cases where the feedstock source or feedstock loading are varying.
Figure 6:
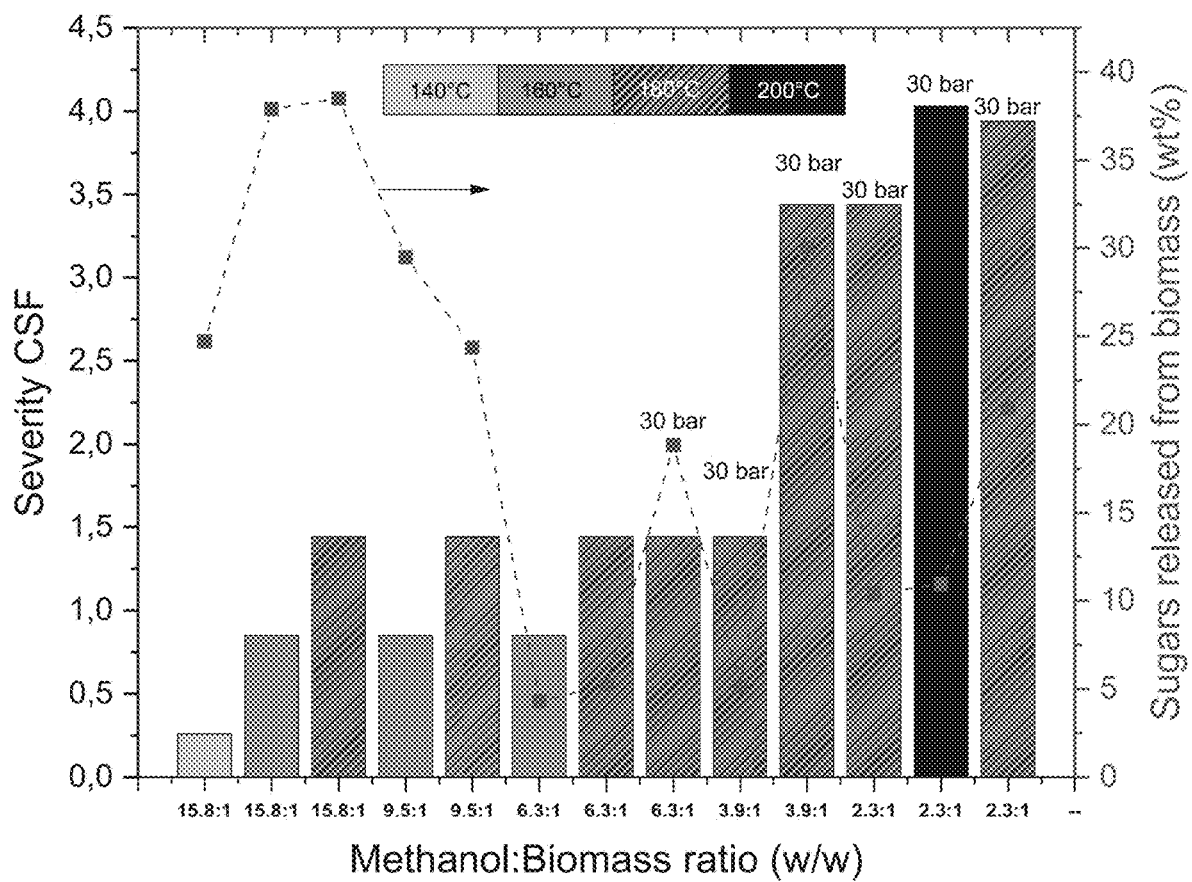
Figure 7:
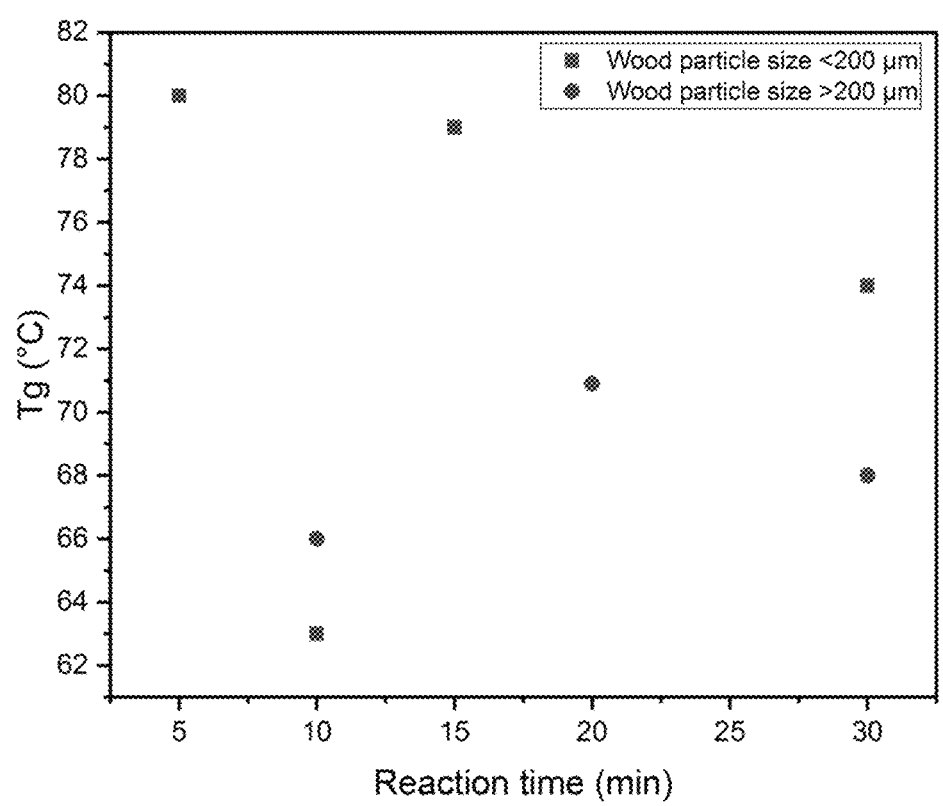
FIG. 7 shows the Tg values of Lignin produced in example 15. Glass transition temperature of extracted lignin oligomers after acid solvolysis of birch wood, with biomass: solvent ratio w/w of 1:9.5, reaction time of 180° C., cold pressure of 30 bar N2, acid loading of 0.49 wt. % sulfuric acid, in different reaction times and wood particle size.

The present invention is positioned as a crude lignin oil-first pretreatment technology, since it targets to extract lignin in its oligomeric form by utilizing and retaining them in pure polar organic solvent together with the extracted methylated C5 sugars, and at the same time deliver a cellulose pulp for further valorization. Solvolytic splitting of ether linkages in lignin and solvolytic cleavage via nucleophilic attack are two main mechanisms that are responsible for lignin depolymerization towards lignin oligomers.

A lignocellulosic feedstock such as hardwood or softwood in the form of chips or sawdust may be provided in a reactor vessel. The lignocellulosic feedstock may then be treated with a polar organic solvent by providing the polar organic solvent into the reactor vessel to solve the lignocellulosic feedstock in said polar organic solvent. Also an inorganic acid is provided in the reactor vessel to act as a reactant, cleaving lignin-carbohydrate linkages and releasing lignin from the lignocellulosic matrix in the lignocellulosic feedstock improving the process efficiency. Furthermore a compressed gas is provided into the reactor which increases the reactor pressure above the vapour pressure of the solvent used. As a result of adding the compressed gas, the polar organic solvent is kept in its liquid phase during the reaction in the reactor vessel, allowing more lignin extraction and dissolution at the desired temperatures.

By providing both the inorganic acid and the compressed gas into the reactor, the ratio of the lignocellulosic feedstock biomass and the polar organic solvent may be kept high while at the same time a high delignification rate is achieved due to a synergetic effect of both the inorganic acid and the compressed gas added.

The delignification rate is defined as the mass % of extracted lignin relative to the lignin in the starting biomass:

Delignification rate=(mass of extracted lignin/mass of lignin in starting biomass)×100%

The ability of the solvents to dissolve or swell lignin increases as the hydrogen-bonding capacities of the solvents and as their solubility parameters (Hildebrand parameter, $\delta 1$ value) approach a value of around 22.5 $(J/cm^3)^{-1/2}$, the approximate solubility parameter of isolated lignin ($\delta 2$ value). If the $\delta 1$ value of the solvent is far away from the $\delta 2$ value of lignin, the solvent cannot solubilize lignin or only can solubilize a small fraction of lignin. The solvent therefore preferably has a $\delta 1$ value of between 20 to 30 $(J/cm^3)^{-1/2}$. Methanol has a $\delta 1$ value of 29.7, ethanol has a $\delta 1$ value of 26.2, and butanol has a $\delta 1$ value of 28.7 and are therefore suitable for the delignification process. Besides having a good lignin solubility, methanol does not form azeotropes with water and has a lower cost. It is therefore preferable to choose methanol as polar organic solvent for the delignification process. Additionally, for polar organic solvents like methanol or ethanol it is acknowledged that the cleavage of aryl ether bonds is responsible for lignin breakdown. The $\alpha$-O-aryl ether bonds are more easily cleaved than $\beta$-O-aryl ether bonds, which are normally broken under more severe conditions, especially at elevated acid concentrations.

To prevent an unrealistically high capital expenditure (CAPEX) for a production plant for the production of a liquid lignin composition from a lignocellulosic feedstock, the ratio of lignin in the lignocellulosic feedstock to polar organic solvent is preferably high to keep the total volume/mass flow through a production plant within reasonable limits. Therefore the ratio (w/w) of lignin (in lignocellulosic feedstock) to polar organic solvent ranges preferably between 1:2 and 1:7, more preferably between 1:2.3 and 1:6.3 or, for example, between 1:2.3 and 1:3.95.

At such high lignin to polar organic solvent ratios, the amount of water in the process is preferably kept relatively low. The amount of water in the process is less than 10 wt. % of the total weight of the reaction mixture in the reactor vessel, preferably less than 5 wt. %, more preferably between 0.5 and 4 or between 1 and 2 wt. %. In an embodiment the water content is between 1 and 9 wt. % or between 2 and 8 wt. %.

The extracted lignin oligomers prepared in the process of the present invention (compared to lignin as polymer i.e. organosols process wherein an excess of water is present) have lower molecular weight, decreased polydispersity, increased processability (since they are soluble in polar organic solvents), and finally lower glass transition temperature.

To improve the lignin extraction at a high ratio of lignocellulosic feedstock biomass to polar organic solvent, an inorganic acid suitable for releasing lignin from said lignocellulosic feedstock is provided as a reagent into the reactor vessel. Preferably, the inorganic acid is chosen from sulfuric acid, hydrochloric acid, or phosphoric acid. More preferably, the inorganic acid is chosen from sulfuric acid or hydrochloric acid.

The amount of delignification from the lignocellulosic feedstock is influenced by the amount of inorganic acid used in the treatment of said lignocellulosic feedstock. At low amounts of acid, part of hemicellulose may be released as oligomers from lignocellulosic materials. Higher amounts of acids are more ideal for delignification and removing C5 sugars distributed in deep cell walls of lignocellulosic materials. Too much acid however may result in a degradation of cellulose and sugars. It is therefore preferred to use an amount of inorganic acid sufficient for delignification and removing C5 sugars from the lignocellulosic feedstock. Preferably, the amount of inorganic acid ranges between 0.1 and 0.7 wt. % relative to the lignocellulosic feedstock. More preferably, the amount of inorganic acid ranges between 0.2 and 0.4 wt. % relative to the lignocellulosic feedstock.

To increase lignin extraction and dissolution, the polar organic solvent should be kept in its liquid phase while in the reactor vessel. To keep the polar organic solvent in its liquid phase, a compressed gas is applied into the reactor vessel which increases the operating pressure in the reactor. Preferably gasses such as nitrogen, air, or hydrogen gas are used for applying compressed gas into the reactor vessel.

The vapour pressure of the organic solvent increases as the temperature of the organic solvent increase, resulting in more organic solvent to vaporize without any pressure exhibited onto the organic solvent to limit or prevent vaporization. Thus to keep the organic solvent in its liquid phase to increase lignin extraction and dissolution, the operating pressure of the reactor should be higher than the vapour pressure of the organic solvent at any given operating temperature. The operating pressure is the pressure of the reactor, which is the sum of the vapour pressure of the solvent at a given temperature and the partial pressure of the compressed gas added to the reactor. Preferably, the operating pressure is at least 2 bar above the vapour pressure of the organic solvent, more preferably at least 5 bar above the vapour pressure of the organic solvent, and even more preferably at least 10 bar above the vapour pressure of the organic solvent. Furthermore, the operating pressure is preferably lower than 100 bar, more preferably lower than 50 bar.

The amount of delignification from the lignocellulosic feedstock is also influenced by the operating temperature at which the delignification takes place. The delignification process preferably takes place at an operating temperature between 140° C. and 200° C.

The amount of delignification from the lignocellulosic feedstock is furthermore also influenced by the residence time of the mixture of lignocellulosic feedstock, polar organic solvent, inorganic acid, and compressed gas in the reactor vessel. At a low residence time, part of hemicellulose may be released as oligomers from lignocellulosic materials. A higher residence time is more ideal for delignification and removing C5 sugars distributed in deep cell walls of lignocellulosic materials. Therefore the residence time is preferably minimal 10 minutes, more preferable 20 minutes.

Furthermore the residence time is preferably up to 200 minutes, more preferable up to 160 minutes, even more preferably up to 120 minutes. For example the residence time is between 25 to 75 minutes.

The product (crude liquid lignin oil (CLO)) obtained in the process according to the present invention has also a unique composition and unique properties. It has been found that the CLO comprising lignin with methylated sugars (without any solvent) can be an oil, which can be handled as a liquid. Optionally the CLO comprises a solvent, preferably methanol to lower the viscosity of the CLO. For example the amount of solvent can be between 0 and 30 wt. % relative to the total weight of the CLO, preferably between 1 and 30 wt. %, or between 2 and 25 wt. %. Preferably the solvent is methanol. This product is formed when high delignification occurs. The delignification rate is preferably at least 80%, more preferably at least 85% or 89%.

Therefore the invention also relates to a crude liquid lignin oil (CLO) comprising lignin oligomers and methylated sugars wherein the ratio (w/w) of lignin oligomers to methylated sugars ranges between 1:1 and 2.5:1, preferably between 1.6:1 and 2:1.

Preferably the number average molecular mass of the lignin oligomers in the CLO ranges between 400 and 1000 g/mol.

Preferably the methylated sugars present in the CLO are selected from methyl-pentopyranoside, methyl-D-gluconpyranoside, methyl-D-xylopyranoside, methyl 3-O-acetylpentopyranoside, dimethyl-4-O-methyl-hexanopyroside, or a mixture thereof.

The inventors have found that the lignin in the CLO has a much lower glass transition temperature (Tg) compared to lignins prepared in prior art processes. The Tg of the lignin in the CLO produced in the process according to the invention is below 82.5° C., preferably between 20 and 82° C., more preferably between 40 and 81° C. or more preferably between 60 and 80° C.

The glass-liquid transition, or glass transition, is the gradual and reversible transition in amorphous materials (or in amorphous regions within semicrystalline materials) from a hard and relatively brittle "glassy" state into a viscous or rubbery state as the temperature is increased. The glass-transition temperature (Tg) of a material characterizes the range of temperatures over which this glass transition occurs.

The Tg of lignin depends on the type of wood and the extraction process and often has a large variation in it. The differences between the Tg is caused by a difference in the composition of monolignols present in the lignin and the intermolecular hydrogen bonding interactions associated with this. To differentiate our technology from the prior art, we have performed an examination on the Tg of technical/biorefinery lignins isolated by different wood pre-treatment and extraction technologies. Typically, according to the prior art, the Tg of organosols- and kraft-derived lignin materials varies and is usually in the range between 85-200° C. The high Tg values of the lignin materials together with the large variations, can be explained by the high condensation degree of the lignins that is caused mainly by wood pretreatment conditions and the applied isolation process (i.e. acid water precipitation).

| Biomass source and pretreatment (in bold) process | $T_g$ [° C.] | Ref |
|---|---|---|
| Milled wood and enzyme lignins (MWEL) from poplar trees (*Populus deltoides* × *populus nigra*). | 170-190 | (1) |
| Kraft lignins (KL) from softwood (SW) and hardwood (HW) from MeadWestvaco (USA). Organosolv lignins from birch and spruce by the VTT organosolv process (Lignofibre, LGF). | 85-192 | (2) |
| Kraft and cosolvent enhance lignocellulosic fractionation (CELF) lignin. | 121-215 | (3) |
| Organosolv lignins from a range of hardwoods, softwoods and crop residues. | 97-175 | (4) |
| Organosolv lignin for wheat straw. | 110 | (5) |
| Medium ash grade lignin from a Kraft-processed softwood biomass. | 117-211 | (6) |
| Protobind 1000 lignin from soda process (agricultural fiber soda pulp), Indulin AT lignin (softwood kraft), Cornstover lignin (derived by cellulosic ethanol production process). | 117-219 | (7) |
| Softwood Kraft lignin | 102-126 | (8) |
| Organosolv lignin from three-year-old black cottonwood and hybrid poplar | 90-140 | (9) |
| Organosolv fractionated yellow poplar (*Liriodendron tulipifera*) | 117-137 | (10) |
| Milled wood and organosolv lignin isolated from yellow poplar (*Lirioden-dron tulipifera*) | 163 | (11) |
| Kraft lignin from southern pine and Norwegian spruce | 230 | (12) |
| Indulin At (softwood Kraft lignin) | 173 | (13) |

REFERENCES (1) Baumberger, S.; Dole; P.; Lapierre, C. Using Transgenic Poplars to Elucidate the Relationship between the Structure and the Thermal Properties of Lignins. Journal of agricultural and food chemistry 2002, 50, 2450-2453.

(2) Ropponen, J.; Räsänen, L.; Rovio, S.; Ohra-Aho, T.; Liitiä, T.; Mikkonen, H.; Van De Pas, D.; Tamminen, T. Solvent Extraction as a Means of Preparing Homogeneous Lignin Fractions. Holzforschung 2011, 65, 543-549.

(3) Wang, Y.-Y.; Li, M.; Wyman, C. E.; Cai, C. M.; Ragauskas, A. J. Fast Fractionation of Technical Lignins by Organic Cosolvents. ACS Sustainable Chemistry & Engineering 2018, 6, 6064-6072.

(4) Sammons, R. J.; Harper, D. P.; Labbé, N.; Bozell, J. J.; Elder, T.; Rials, T. G. Characterization of Organosolv Lignins Using Thermal and FT-IR Spectroscopic Analysis. BioResources 8 (2): 2752-2767 2013, 8, 2752-2767.

(5) Cachet, N.; Camy, S.; Benjelloun-Mlayah, B.; Condoret, J.-S.; Delmas, M. Esterification of Organosolv Lignin under Supercritical Conditions. Industrial Crops and Products 2014, 58, 287-297.

(6) Saito, T.; Perkins, J. H.; Vautard, F.; Meyer, H. M.; Messman, J. M.; Tolnai, B.; Naskar, A. K. Methanol Fractionation of Softwood Kraft Lignin: Impact on the Lignin Properties. ChemSusChem 2014, 7, 221-228.

(7) Li, H.; McDonald, A. G. Fractionation and Characterization of Industrial Lignins. Industrial crops and products 2014, 62, 67-76.

(8) Sen, S.; Patil, S.; Argyropoulos, D. S. Methylation of Softwood Kraft Lignin with Dimethyl Carbonate. Green Chemistry 2015, 17, 1077-1087, (9) Sun, Q.; Khunsupat, R.; Akato, K.; Tao, J.; Labbe, N.; Gallego, N. C.; Bozell, J. J.; Rials, T. G.; Tuskan, G. A.; Tschaplinski, T. J.; et al. A Study of Poplar Organosolv Lignin after Melt Rheology Treatment as Carbon Fiber Precursors. Green Chemistry 2016, 18, 5015-5024.

(10) Tao, J.; Hosseinaei, O.; Delbeck, L.; Kim, P.; Harper, D. P.; Bozell, J. J.; Rials, T. G.; Labbe, N. Effects of Organosolv Fractionation Time on Thermal and Chemical Properties of Lignins. RSC advances 2016, 6, 79228-79235.
(11) Park, S. Y.; Kim, J.-Y.; Youn, H. J.; Choi, J. W. Fractionation of Lignin Macromolecules by Sequential Organic Solvents Systems and Their Characterization for Further Valuable Applications. International journal of biological macromolecules 2018, 106, 793-802.
(12) Dodd, A. P.; Kadla, J. F.; Straus, S. K. Characterization of Fractions Obtained from Two Industrial Softwood Kraft Lignins. ACS Sustainable Chemistry & Engineering 2015, 3, 103-110.
(13) Passoni, V.; Scarica, C.; Levi, M.; Turn, S.; Griffini, G. Fractionation of Industrial Softwood Kraft Lignin: Solvent Selection as a Tool for Tailored Material Properties. ACS Sustainable Chemistry & Engineering 2016, 4, 2232-2242.

The composition can also obtain other sugars and extraction products from the lignocellulosic feedstock.

Preferably the amount of lignin and C5 methylated sugars is between 30 and 80 wt. % of the CLO, excluding any solvent.

The CLO can be obtained in accordance with the process of the present invention.

The CLO may be subjected to a treatment to remove the methylated sugars (if present) and the organic solvent which results in a lignin based thermoplastic material. Such a treatment may be, for instance, vacuum distillation of the CLO.

EXAMPLES AND COMPARATIVE EXAMPLES

A crude liquid lignin oil (CLO) was produced by treating a lignocellulosic feedstock such as a woody biomass feedstock like for instance wood chips or saw dust with a polar organic solvent in the presence of an inorganic acid and a compressed gas.

During this process, the lignocellulosic feedstock was fractioned by means of the polar organic solvent wherein the inorganic acid acted as a reagent cleaving the lignin-carbohydrate linkages present in the lignocellulosic matrix of the lignocellulosic feedstock thereby improving the release of lignin from the feedstock and the compressed gas kept the polar organic solvent in a liquid phase thereby allowing more lignin extraction and dissolution into the polar organic solvent.

The lignocellulosic feedstock together with the polar organic solvent, the inorganic acid, and the compressed gas were provided into a reactor and treated under autoclave conditions.

Experiments were conducted using birch hardwood or Douglas softwood which was fractioned in methanol, in varying biomass-to-solvent ratios, using different acids at varying acid concentrations and compressed nitrogen or hydrogen gas of 10 to 30 bar at various temperatures ranging from 140° C. to 200° C. for 30 to 120 minutes.

After the reactions, the reaction mixture was subjected to vacuum filtration to separate the crude liquid lignin oil from the cellulose pulp remainder of the solid feedstock after the fractioning. The crude liquid lignin oil comprises extracted low molecular weight oligomeric lignin fragments and some polysaccharides.

As plant cells in the woody biomass feedstock comprise typical lignin-carbohydrate interlinkages such as phenyl glycoside, benzyl ether and γ-ester bonds, an efficient cleavage is required for lignin extraction and valorisation. The release of sugars, however, cannot be prevented and they may be converted to furfurals which may cause undesired repolymerisation due to lignin-furfural condensation reactions. The use of an acid hydrolysis step also releases some of the polysaccharides from the lignocellulosic matrix present in the woody biomass feedstock. In general, the retention of the C6 sugars is much higher than that of C5 (hemicellulose) sugars during acid delignification because of the high crystallinity of cellulose.

When sulfuric acid ($H_2SO_4$) was used, most of the hemicellulose was converted into methylated sugars such as methyl-pentopyranoside, methyl-D-gluconpyranoside, methyl-D-xylopyranoside, methyl 3-O-acetylpentopyranoside and dimethyl-4-O-methyl-hexanopyroside. Selectivity to the various sugars depends on the used process conditions such as solvent amount or acid severity. Methylated sugars can be separated from the lignin fragments by for instance liquid-liquid extraction using ethyl acetate or water. A high degree of delignification is always accompanied by a large extent of C5 sugars release.

The effect of the temperature, cooking time and the pH on the process can be integrated in the Combined Severity Factor (CSF). This Combined Severity Factor (CSF) is defined according to Formula I:

$$CSF = \log\left[t\exp\left(\frac{T - Tref}{14.7}\right)\right] - pH \qquad \text{Formula 1}$$

In Formula I, t is the treatment time of the process in minutes, T is the treatment temperature in ° C., $T_{ref}$ is a reference temperature of 100° C., and pH is the acidity of the solvent medium.

The biomass solubility, degree of delignification, and hydrolysis of hemicellulose generally increases with an increasing CSF, however degradation of cellulose and sugars become significant at a high CSF. Part of hemicellulose could be released as oligomers at low CSF values, while high CSF values are ideal for delignification and removing the C5 sugars distributed in deep cell wall.

The amounts and conditions used for the experiments are shown in Table 1. The results of the experiments are shown in Table 2.

TABLE 1

| | WT | WA (g) | Methanol (ml) | Sol/WA (g/g) | SAcid (mmol/L) | SAcid/WA (wt. %) | Temperature and Time | CGas (bar) |
|---|---|---|---|---|---|---|---|---|
| | | | | Comparative Examples | | | | |
| CE1 | birch sawdust | 3.0 | 60 | 15.8:1 | 4 | 0.81 | 140° C., 2 h | 0 |
| CE2 | birch sawdust | 3.0 | 60 | 15.8:1 | 4 | 0.81 | 160° C., 2 h | 0 |
| CE3 | birch sawdust | 3.0 | 60 | 15.8:1 | 4 | 0.81 | 180° C., 2 h | 0 |
| CE4 | birch sawdust | 3.0 | 36 | 9.5:1 | 4 | 0.49 | 160° C., 2 h | 0 |

TABLE 1-continued

|   | WT | WA (g) | Methanol (ml) | Sol/WA (g/g) | SAcid (mmol/L) | SAcid/WA (wt. %) | Temperature and Time | CGas (bar) |
|---|---|---|---|---|---|---|---|---|
| CE5 | birch sawdust | 3.0 | 24 | 6.3:1 | 4 | 0.32 | 160° C., 2 h | 0 |
| CE6 | birch sawdust | 3.0 | 36 | 9.5:1 | 4 | 0.49 | 180° C., 2 h | 0 |
| CE7 | birch sawdust | 3.0 | 24 | 6.3:1 | 4 | 0.32 | 180° C., 2 h | 0 |
| | | | | Examples | | | | |
| E1 | birch sawdust | 3.0 | 24 | 6.3:1 | 4 | 0.32 | 180° C., 2 h | 30 (H2) |
| E2 | birch sawdust | 3.0 | 24 | 6.3:1 | 4 | 0.32 | 180° C., 2 h | 30 (N2) |
| E3 | birch sawdust | 3.0 | 15 | 3.9:1 | 4 | 0.20 | 180° C., 2 h | 30 (N2) |
| E4 | birch sawdust | 4.8 | 24 | 3.9:1 | 4 | 0.20 | 180° C., 2 h | 30 (N2) |
| E5 | birch sawdust | 4.8 | 24 | 3.9:1 | 8 | 0.40 | 180° C., 2 h | 30 (N2) |
| E6 | birch sawdust | 12 | 36 | 2.3:1 | 8 | 0.24 | 180° C., 2 h | 30 (N2) |
| E7 | birch sawdust | 12 | 36 | 2.3:1 | 8 | 0.24 | 200° C., 2 h | 30 (N2) |
| E8 | birch sawdust | 200 | 1600 | 6.3:1 | 4 | 0.32 | 180° C., 2 h | 30 (N2) |
| E9 | birch sawdust | 12 | 36 | 2.3:1 | 10 | 0.30 | 180° C., 2 h | 30 (N2) |
| | | | | Acid type effect | | | | |
| E10 | birch sawdust | 12 | 36 | 2.3:1 | 25 ($H_3PO_4$) | 0.94 ($H_3PO_4$) | 180° C., 2 h | 30 (N2) |
| E11 | birch sawdust | 12 | 36 | 2.3:1 | 10 (HCl) | 0.27 (HCl) | 180° C., 2 h | 30 (N2) |
| | | | | Wood type | | | | |
| E12 | Douglas sawdust | 12 | 36 | 2.3:1 | 10 | 0.30 | 180° C., 2 h | 30 (N2) |
| | | | | Pressure effect | | | | |
| CE8 | birch sawdust | 12 | 36 | 2.3:1 | 10 | 0.30 | 180° C., 2 h | 0 |
| E13 | birch sawdust | 12 | 36 | 2.3:1 | 10 | 0.30 | 180° C., 2 h | 10 (N2) |
| E14 | birch sawdust | 12 | 36 | 2.3:1 | 10 | 0.30 | 180° C., 2 h | 20 (N2) |
| CE6 | birch sawdust | 3.0 | 36 | 9.5:1 | 4 | 0.49 | 180° C., 2 h | 0 |
| E15 | birch sawdust | 3.0 | 36 | 9.5:1 | 4 | 0.49 | 180° C., 2 h | 30 |
| | | | | Wood chips | | | | |
| E16 | birch chips | 3 | 24 | 6.3:1 | 4 | 0.32 | 180° C., 2 h | 30 (N2) |
| | | | | Time Effect | | | | |
| E17 | birch sawdust | 4.8 | 24 | 3.9:1 | 8 | 0.40 | 180° C., 30 min | 30 (N2) |
| E18 | birch sawdust | 4.8 | 24 | 3.9:1 | 8 | 0.40 | 180° C., 60 min | 30 (N2) |
| | | | | Solvent effect | | | | |
| E19 | birch sawdust | 4.8 | 24 (ethanol) | 3.9:1 | 8 | 0.40 | 180° C., 60 min | 30 (N2) |

WT = Wood Type;
WA = Wood amount (g);
Sol/WA = solvent (g) to Wood Amount (g);
SAcid = sulfuric acid (mmol/l);
CGas = compressed gas (bar)

TABLE 2

|   | Wood | | Liquid fraction (g) | | | | | Mass |
|---|---|---|---|---|---|---|---|---|
|   | CSF | Residue (g) | Lignin + sugars | Lignin oil | MC5 sugars | Other sugars | DL | Balance (wt. %) |
| | | | Comparative examples | | | | | |
| CE1 | 0.26 | 1.601 (53.3%) | 1.214 (40.46%) | 0.471 (15.7%) | 0.190 (6.33%) | (18.43%) | 67% | 94% |
| CE2 | 0.85 | 1.250 (41.7%) | 1.816 (60.5%) | 0.679 (22.6%) | 0.753 (25.1%) | (12.80%) | 96% | 102% |
| CE3 | 1.44 | 1.042 (34.73%) | 2.024 (67.46%) | 0.868 (28.93%) | 0.529 (17.63%) | (20.90%) | 123% | 102% |
| CE4 | 0.85 | 1.584 (52.80%) | 1.405 (46.83%) | 0.5206 (17.35%) | 0.275 (9.16%) | (20.32%) | 74% | 99% |
| CE5 | 0.85 | 2.416 (80.5%) | 0.565 (18.83%) | 0.229 (7.63%) | 0.045 (1.5%) | (9.70%) | 39% | 99.3% |
| CE6 | 1.44 | 1.255 (41.8%) | 1.480 (40.8%) | 0.749 (25%) | 0.721 (24%) | (0%) | 106% | 82.6% |
| CE7 | 1.44 | 2.268 (75.6%) | 0.385 (12.83%) | 0.229 (7.63%) | 0.00 | (5.2%) | 32% | 88.4% |
| | | | Examples | | | | | |
| E1 | 1.44 | 1.655 (55.2%) | 1.270 (40.3%) | 0.738 (24.6%) | 0.345 (11.50%) | (4.2%) | 104% | 95.5% |
| E2 | 1.44 | 1.616 (53.8%) | 1.2824 (42.7%) | 0.7173 (24%) | 0.411 (13.7%) | (5%) | 102% | 96.5% |
| E3 | 1.44 | 2.2195 (73.9%) | 0.554 (18.48%) | 0.3991 (13.3%) | 0.00 | (5.18%) | 56% | 92.3% |
| E4 | 1.44 | 3.6104 (75.2%) | 0.7386 (15.3%) | 0.5831 (12.14%) | 0.00 | (3.16%) | 51% | 91% |
| E5 | 3.44 | 2.0628 (42.9%) | 2.5347 (52.8%) | 1.0934 (22.78%) | 0.674 (14.04%) | (15.98%) | 96% | 96% |
| E6 | 3.44 | 7.953 (66.27%) | 3.2017 (26.68%) | 1.9541 (16.28%) | 0.089 (0.74%) | (9.66%) | 69% | 93% |
| E7 | 4.03 | 7.4277 (61.89%) | 3.3175 (27.6%) | 2.0038 (16.69%) | 0.355 (3%) | (7.91%) | 71% | 90% |
| E8 | 1.44 | 120 (60%) | 72.24 (36.12%) | 33.92 (16.96%) | 8.0571 (4%) | (15.16%) | 72% | 96% |
| E9 | 3.94 | 7.044 (58.7%) | 4.6105 (38.4%) | 2.5178 (20.91%) | 1.418 (11.81%) | (5.68%) | 89% | 97% |

TABLE 2-continued

| | | Wood Residue (g) | Liquid fraction (g) | | | | | Mass Balance (wt. %) |
| | CSF | | Lignin + sugars | Lignin oil | MC5 sugars | Other sugars | DL | |
|---|---|---|---|---|---|---|---|---|
| | | | Acid type effect | | | | | |
| E10 | 3.94 | 7.4488 (62.07%) | 3.4911 (29.09%) | 1.6760 (13.96) | 0.129 (1.075%) | (14.05%) | 59% | 91% |
| E11 | 3.94 | 6.7655 (56.37%) | 4.0299 (33.58%) | 2.2721 (18.93%) | 1.081 (9.014%) | (5.636%) | 80% | 90% |
| | | | | Wood type | | | | |
| E12 | 3.94 | 5.6361 (49.96%) | 5.6296 (46.91%) | 2.4276 (20.23%) | 0.195 (1.62%) | (25.6%) | 68% | 97% |
| | | | | Pressure effect | | | | |
| CE8 | 3.94 | 9.499 (79.15%) | 2.03 (16.91%) | 0.9731 (8.10%) | 0.094 (0.79%) | (8.02%) | 34% | 96% |
| E13 | 3.94 | 8.616 (71.8%) | 2.784 (23.2%) | 1.3849 (11.54%) | 0.1536 (1.28%) | (10.38%) | 49% | 95% |
| E14 | 3.94 | 5.4998 (45.83%) | 5.6604 (47.17%) | 2.7198 (22.65%) | 1.5588 (12.99%) | (11.53%) | 96% | 93% |
| CE6 | 1.44 | 1.255 (41.8%) | 1.480 (40.8%) | 0.749 (25%) | 0.721 (24%) | (0%) | 106% | 82.6% |
| E15 | 1.44 | 1.8117 (45.3%) | 2.068 (51.7%) | 0.892 (22.3%) | 0.874 (21.8%) | (7%) | 92% | 97% |
| | | | | Wood chips | | | | |
| E16 | 1.44 | 2.0182 (67.27%) | 0.79 (26.39%) | 0.3177 (10.59%) | 0.049 (1.63%) | (14.17%) | 45% | 94% |
| | | | | Time Effect | | | | |
| E17 | 2.84 | 2.4156 (50.10%) | 2.1664 (44.90%) | 1.0226 (21.2%) | 0.518 (10.79%) | (12.91%) | 90% | 95% |
| E18 | 3.14 | 2.6265 (54.8%) | 2.0398 (42.60%) | 1.0494 (21.9%) | 0.613 (12.77%) | (7.93%) | 93% | 97% |
| | | | | Solvent Effect | | | | |
| E19 | 3.14 | 2.3024 (47.96%) | 2.2564 (47%) | 1.1051 (23%) | 0.682 (13.99%) | (10.01%) | 97% | 95% |

CSF = severity factor;
DL = delignification;
MC5 sugars = Methylated C5 Sugars (determined with GC)

The birch sawdust and chips used in the examples and comparative examples comprise about 23.6 wt. % of lignin, whereas the Douglas sawdust comprises about 29.9 wt. % of lignin. The wood residue in the example and comparative examples was air dried at 60° C.

Table 3 shows the molecular weight of the extracted lignin fractions obtained from different process conditions like biomass loading, reaction temperature and acid loading. We observe that the number average molecular weight of all the extracted lignins (softwood), is in the range of about 600-1000 Dalton. Fluctuations on the molecular weight can be observed, which probable are connected with the different acidic environment. But at this stage, with such small MW differences, it is still difficult to extract some conclusions on the influence that acid and temperature are having in the quality of lignin we are extracting, especially because of the heterogeneity of biomass when such high loadings are applied. For the hardwood feedstock (Douglas) this number is increasing to 951 Dalton—indicating the higher complexity of that feedstock. It is important to mention here that for our optimum delignification entry [Birch—2.3:1—30 bar—180° C.—0.30 wt. % $H_2SO_4$], for all three polar organic solvents (methanol, ethanol, butanol), and after we performed the liquid-liquid extraction to separate the lignin from the sugar fraction from the lignin oil, we transferred the solid lignin in the drying oven (100° C.) and we observed that it melted and had a flowing behaviour. Further research showed that the respective samples appear to have a glass transition temperature (Tg) below 100° C., a results most probably associated with the low molecular weight of the extracted lignin fragments.

Molecular weights have been measured using Gel Permeation Chromatography (GPC). GPC analyses were performed by using a Shimadzu Prominence-I LC-2030C 3D apparatus equipped with two columns connected in series (Mixed-C and Mixed-D, polymer Laboratories) and a UV-Vis detector at 254 nm. The column was calibrated with Polystyrene standards. Analyses were carried out at 25° C. using THF as eluent with a flow rate of 1 ml/min. For the model compound analysis, an aliquot of 40 µl solution was taken from the reaction mixture followed by removing the solvent by blowing with air under room temperature. The sample was dissolved with 1 ml THF (the concentration is ~2 mg/ml). For the lignin residue analysis, the sample was prepared at a concentration of 2 mg/ml. All the samples were filtered using 0.45 µm filter membrane prior to injection. These procedures are in accordance with a publication of Emilie J. Siochi et al. in Macromolecules 1990, 23, 1420-1429.

TABLE 3

Number average molecular mass (Mn), mass average molecular mass (Mw) and polydispersity of lignin extracted from different process conditions. [Biomass type - solvent:biomass ratio - applied cold pressure - operating temperature - acid loading]

| Entry | Mn | Mw | (Mw/Mn) |
|---|---|---|---|
| Birch softwood - 6.3:1 - 30bar - 180° C. - 0.32 wt. % $H_2SO_4$ | 708 | 1943 | 2.74 |
| Birch - 3.9:1 - 30bar -180° C. - 0.40 wt. % $H_2SO_4$ | 741 | 1546 | 2.08 |
| Birch - 2.3:1 - 30bar - 180° C. - 0.24 wt. % $H_2SO_4$ | 624 | 1467 | 2.35 |
| Birch - 2.3:1 - 30bar -180° C. - 0.30 wt. % $H_2SO_4$ | 675 | 1750 | 2.59 |
| Birch - 2.3:1 - 30bar -180° C. - 0.94 wt. % $H_3PO_4$ | 716 | 1759 | 2.45 |
| Birch - 2.3:1 - 30bar -180° C. - 0.30 wt. % HCl | 667 | 1588 | 2.38 |
| Douglas hardwood- 2.3:1 - 30bar -180° C. - 0.30 wt. % $H_2SO_4$ | 951 | 2877 | 3.02 |

Example 15

We used as delignification conditions of comparative experiment CE6 [Birch—9.5:1—180° C.—0.49 wt. %

H₂SO₄], except that 30 bar pressure was applied. Methanol has been applied as solvent. Different reaction conditions [5, 10, 5, 20, 30 minutes] have been investigated. We investigated different wood particle sizes: below and above 200 µm. After the extraction process, the solid-liquid slurry mixture was subjected to a solid-liquid filtration process to separate the wood residue (cellulose pulp) from the liquid product fraction (lignin and sugars dissolved in methanol). In order to separate the extracted lignin oligomers from the sugar fractions we first removed the methanol by rotary evaporation and then performed multiple liquid-liquid extractions using a mixture of ethyl acetate and water. The extracted solid lignin oligomers were then dried in a vacuum oven overnight (60° C.) to ensure the absence of solvent residuals. The glass transition temperatures ($T_g$) of the solid lignin oligomers were determined via differential scanning calorimetry (DSC). Approximately 10 mg of dried lignin oligomers were used for the measurements on the Netzsch Polyma 2014 DSC. Two heating/cooling cycles with a heating/cooling rate of 10° C./min in the range of −40 to 150° C. were performed. The $T_g$ of the solid lignin oligomers was determined as the temperature at the midpoint of the transition for the second heating cycle, Indium, zinc, tin, and bismuth were used as standards for temperature and enthalpy calibration. When the particle size of the woody biomass was below 200 µm, the Tg of the extracted lignin oligomers was 80° C. after 5 minutes of reaction time, while it dropped to 63.7° C. after 10 minutes reaction time where the maximum delignification was achieved. Longer reaction times (15 minutes and 30 minutes) did not improve the lignin extraction efficiency, but influenced the Tg which increased to 74-79° C. For larger wood particle sizes (>200 µm), the Tg of the extracted lignin oligomers after 10 minutes residence time was 66.8° C. (maximum delignification achieved), while for 20 and 30 minutes it was 70 and 68.5° C. respectively.

Comparative examples CE1 to CE8 show the experiments in accordance with the state of the art wherein no compressed gas is added into the reaction mixture present in the reactor vessel. As can be seen in the table in FIG. 1, the amount of delignification drops when the biomass to solvent ratio increases while the other parameters are kept the same. For instance when comparing CE2, CE4, and CE5 it can be seen that the amount of solvent is lowered, thereby increasing the biomass to solvent ratio, the amount of delignification drops. Similarly, this can also be seen when comparing CE3, CE6 and CE7.

Examples E1 to E18 all show experiments in accordance with the present invention wherein a compressed gas is added into the reaction mixture present in the reaction vessel.

As can be seen in for instance E1, adding a compressed gas to the reaction mixture improves the amount of delignification in comparison to CE7 where all parameters are the same except for the addition of compressed gas. While in E1 compressed hydrogen was used, in E2 compressed nitrogen was used showing a similar improvement of the amount of delignification in comparison to CE7.

Furthermore it can be seen in for instance examples E2 to E4 that even with the addition of compressed gas the amount of delignification drops when the biomass to solvent ratio is further increased. However as can be seen in E5 in comparison to E4, when increasing the amount of sulfuric acid the amount of delignification is again improved. When increasing the biomass to solvent ratio even further as in E9, the amount of sulfuric acid was also increased further thereby showing a sufficient amount of delignification.

E7 shows, in comparison to E6, that a higher operating temperature slightly increases the degree of delignification.

In comparison to E9, it can be seen in E11 that the use of hydrochloric acid instead of sulfuric acid leads to similar results whereas using phosphoric acid leads to a moderate result.

Example E12 demonstrates that a high biomass to solvent ratio while adding both a high amount sulfuric acid together and a compressed gas also leads to a good delignification using a different type of wood.

As can be seen in E13 and E14 in conjunction with E9, the operating pressure of the compressed gas is also relevant for the amount of delignification in the reactor vessel. E13 shows that an operating pressure of 10 bar of the compressed gas leads to a moderate delignification whereas an operating pressure of 20 bar or 30 as shown in E14 and E9, respectively, show a high amount of delignification.

It can be seen in E16 that the use of wood chips in comparison to wood sawdust leads to a decrease of delignification due to the reduced contact surface area of wood chips compared to wood sawdust.

From E17 and E18 in conjunction with E5 it can be seen that a high degree of delignification already is established at a residence time of 30 minutes and increases even further upon a residence time of 60 and 120 minutes.

Example E19 show that, in comparison to Example E18, a high degree of delignification is also realised when using a different solvent such as ethanol instead of methanol.

What is claimed is:

1. A process for the production of a crude liquid lignin oil (CLO), said process comprising the steps of:
   a. providing a lignocellulosic feedstock in native form;
   b. treating the lignocellulosic feedstock in a reactor with a polar organic solvent in the presence of an inorganic acid and added gas that provides an operating pressure that keeps the polar organic solvent in a liquid phase during the treatment to provide a crude liquid lignin oil (CLO);
   wherein the treatment is conducted
   1) at an operating temperature between 100° C. and 210° C.,
   2) at the operating pressure that is lower than 200 bar and at least 1 bar above a vapour pressure of the polar organic solvent at the operating temperature,
   3) a residence time up to 240 minutes,
   4) wherein an amount of water in the process is less than 10 wt. %, and
   5) wherein a ratio of lignin in lignocellulosic feedstock to polar organic solvent on a w/w basis ranges between 1:1.5 and 1:9.

2. The process according to claim 1, wherein the polar organic solvent is one or more of methanol, ethanol and butanol.

3. The process according to claim 2, wherein the inorganic acid is sulfuric acid, hydrochloric acid, or phosphoric acid, wherein the amount of inorganic acid ranges between 0.1 and 0.7 wt. % relative to the lignocellulosic feedstock, wherein the added gas is nitrogen, air or hydrogen, and wherein the operating temperature is between 140° C. and 200° C.

4. The process according to claim 2, wherein the inorganic acid is sulfuric acid or hydrochloric acid; wherein the amount of inorganic acid ranges between 0.2 and 0.4 wt. % relative to the lignocellulosic feedstock; wherein the added gas is nitrogen, air or hydrogen; wherein the operating temperature is between 140° C. and 200° C.; wherein the operating pressure is at least 10 bar above the vapour pressure of the organic solvent; wherein the operating pressure is lower than 50 bar; wherein the residence time is up to 120 minutes; wherein the ratio of lignin in lignocellulosic feedstock to polar organic solvent on a w/w basis ranges between 1:2.3 and 1:6.3; and wherein the amount of water in the process is between 0.5 and 4 wt. %, of the total weight.

5. The process according to claim 1, wherein the inorganic acid is sulfuric acid, hydrochloric acid, or phosphoric acid.

6. The process according to claim 1, wherein the amount of inorganic acid ranges between 0.1 and 0.7 wt. % relative to the lignocellulosic feedstock.

7. The process according to claim 1, wherein the added gas is nitrogen, air or hydrogen.

8. The process according to claim 1, wherein the operating temperature is between 140° C. and 200° C.

9. The process according to claim 1, wherein the operating pressure is at least 2 bar above the vapour pressure of the organic solvent, and wherein the operating pressure is lower than 100 bar.

10. The process according to claim 1, wherein the residence time is up to 200 minutes.

11. The process according to claim 1, wherein the ratio of lignin in lignocellulosic feedstock to polar organic solvent on a w/w basis ranges between 1:2 and 1:7.

12. The process according to claim 1, wherein the amount of water in the process is less than 5 wt. %, of the total weight.

13. The process according to claim 1, wherein the operating pressure is at least 2 bar above the vapour pressure of the organic solvent, wherein the operating pressure is lower than 100 bar; wherein the residence time is up to 200 minutes; wherein the ratio of lignin in lignocellulosic feedstock to polar organic solvent on a w/w basis ranges between 1:2 and 1:7; and wherein the amount of water in the process is less than 5 wt. %.

* * * * *